Dec. 8, 1931. G. H. HUFFERD 1,835,154
BALL JOINT
Filed Jan. 31, 1930
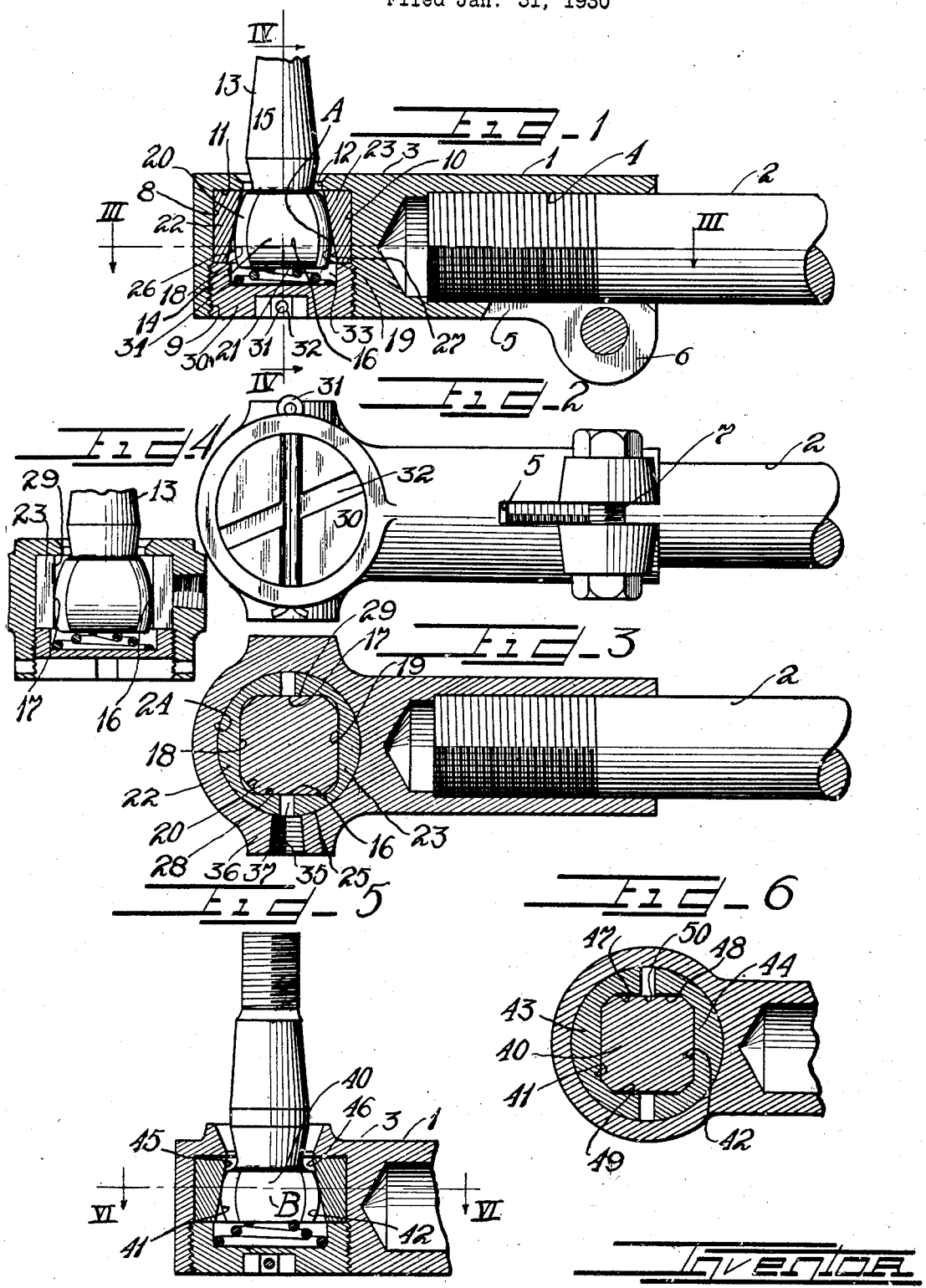

Patented Dec. 8, 1931

1,835,154

UNITED STATES PATENT OFFICE

GEORGE H. HUFFERD, OF DETROIT, MICHIGAN, ASSIGNOR TO THOMPSON PRODUCTS, INCORPORATED, OF CLEVELAND, OHIO, A CORPORATION OF OHIO

BALL JOINT

Application filed January 31, 1930. Serial No. 424,798.

This invention relates to a ball joint for use with tie rods in the steering mechanism of automotive vehicles and the like.

In general, ball joints heretofore proposed and used for this purpose have included a ball stud having a spherical ball, a housing therefor and bearing seats interposed between the spherical ball and the housing, with means usually provided for taking up wear and compensating for play between the ball and bearing seats. In such previous constructions, owing to difficulties in grinding perfectly spherical faces on the ball and ball seats, the contact between such ball and ball seats is generally of a limited area and may be regarded as substantially point contact rather than surface contact, such as would be the case were true spherical surfaces provided.

The result of such limited contacting area between the ball and the ball seat has been shorter life of the ball joint, due principally to the impossibility of securing adequate lubrication because of the high pressure developed between the cooperating surfaces at the points of contact.

It is therefore an important object of this invention to provide a ball joint wherein the ball is of polygonal cross section and in line contact with the ball seat.

It is a further important object of this invention to improve the construction of ball joints and to reduce the cost of manufacturing the same.

Other and further important objects of this invention will become apparent from the following description and appended claims.

This invention (in a preferred form) is illustrated in the drawings and hereinafter more fully described.

On the drawings:

Figure 1 is a longitudinal sectional view of a tie rod end connection illustrating a ball joint of my invention, with the ball stud and end of the tie rod in elevation.

Figure 2 is a bottom plan view of the same.

Figure 3 is a sectional view taken substantially on line III—III of Figure 1, with the tie rod end in elevation.

Figure 4 is a sectional view taken substantially on line IV—IV of Figure 4.

Figure 5 is a longitudinal sectional view of a ball joint of a slightly modified form, with the ball stud in elevation.

Figure 6 is a sectional view taken substantially on line VI—VI of Figure 5.

As shown on the drawings:

The reference numeral 1 indicates as a whole a tie rod end connection, comprising a tie rod 2, a housing 3 having an internally threaded socket 4 for receiving the threaded end of said tie rod 2 and slotted at 5 for a portion of its length to provide spaced cooperating lugs 6 adapted to be drawn together by means of a bolt 7 to clamp the housing upon the tie rod end. The specific cooperating features between the housing 3 and end of the tie rod 2 form no part of the present invention and may be varied at will.

The housing 3 is provided with a cylindrical bore 8, the axis of which is normal to the longitudinal axis of the housing and tie rod. Said bore 8 is threaded as at 9 for a portion of the distance from one of its ends and is then provided with a smooth cylindrical wall 10 of slightly smaller diameter that extends to an inner shoulder 11 formed by a reduction of the bore as at 12. A ball stud, indicated as a whole by the reference numeral 13, is inserted in the bore 8 in such a manner that the ball 14 of said ball stud fits within said bore with the shank 15 of said ball stud extending outwardly through the reduced portion 12 of said bore.

In accordance with the principles of my invention, the ball 14 is formed with two pairs of opposed cylindrical surfaces, 16 and 17, and 18 and 19. Each of said opposed cylindrical surfaces has an axis of curvature normal to the axis of the ball stud 13. As shown, all of the axes of curvature lie in a common plane with the axis of the tie rod, but this is not essential to the operation of the device. Successive cylindrical surfaces around the perimeter of the ball 14 are joined by chamfered and rounded corner surfaces 20. Any section of the ball 14 taken through a plane normal to the axis of the ball stud is substantially polygonal. As here illustrated, the cross section is a square, but it will be understood that a ball of more or fewer cylindrical faces might be employed within the scope of this invention. The ball 14 is provided with a flat bottom 21.

A pair of spaced ball seats 22 and 23 is adapted to be positioned between the ball 14 and the inner cylindrical wall 10 of the housing. Each of said ball seats 22 and 23 is formed with an outer cylindrical surface 24 and 25, respectively, in contact with and conforming to the cylindrical wall 10. The ball seats 22 and 23 are also both provided with inner opposed tapered plane surfaces 26 and 27, respectively, adapted to form line contact with the cylindrical faces 18 and 19 of the ball 14. At each end of the ball seats 22 and 23, however, beyond the tapered faces 26 and 27 are formed straight plane surfaces 28 and 29, respectively, said straight plane surfaces cooperating in contacting the cylindrical faces 16 and 17 of the ball 14.

This construction permits of line contact between the respective faces of the ball 14 and the corresponding inner surfaces of the ball seat members 22 and 23 with resultant increase in ease of lubrication over the usual type of construction employing ball and spherical ball seats and wherein point contact only is usually obtained due to imperfections in the grinding of spherical surfaces. The provision of the chamfered corners and rounded surfaces between the cylindrical faces of the ball 14 makes possible slight angular movement of the ball stud 13 with respect to its normal axis or the axis of the cylindrical bore 8.

A plug 30 is screwed into the threaded portion 9 of the bore 8 against the adjacent end of the seat members 22 and 23 and is there held in place by means of a cotter pin 31 extending through the side wall of said housing 3 surrounding the bore 8 and through one of a plurality of slots 32 formed in the bottom face of said plug 30. Between the bottom face 21 of the ball 14 and the plug 30 and in a cylindrical depression 33 is mounted a helicoidal spring 34 for resiliently urging the ball 14 into contact with the tapered plane faces 26 and 27 of the ball seat members 22 and 23. Wear between the various contacting surfaces is thus compensated for and play automatically taken up.

In assembling the ball joint, the seat members may first be inserted into position with their end faces abutting the shoulders 11 and their cylindrical outer surfaces contacting the cylindrical wall 10 of the housing. The ball stud 13 is then inserted into the bore 8 until its shank 15 projects through the restricted portion 12 of said bore and the cylindrical surfaces of said ball 14 are in contact with the inner surfaces of said seat members 22 and 23. The plug 30 with the helicoidal spring 34 positioned in the cylindrical depression 33 is then screwed into the threaded portion 9 of said bore until the desired amount of compression has been put upon the spring 34. The cotter pin 31 is then positioned in place to prevent unscrewing of said plug 30.

The ball joint may be suitably lubricated through a threaded opening 35 extending through a boss 36 formed on said housing. The spaced bearing seats 22 and 23 are preferably initially placed so that one of the spaces 37 between the respective ends of said seats forms a continuation of the opening 35 to permit the lubricant to pass in between the cooperating faces of the ball 14 and inner faces of the bearing seats 22 and 23. Said opening 35 is adapted to be closed by any suitable type of lubricating fitting or the like (not shown).

In Figures 5 and 6, there is shown a slightly modified form of my invention, the only difference being that the cylindrical faces of the ball have a different radius of curvature and axes of curvature differently positioned from the radius of curvature and axes of curvature of the cylindrical faces of the ball 14 in Figures 1 to 4 inclusive. In the case of the ball shown in these previous figures, the axis of curvature for one cylindrical face lies in the plane of the opposed cylindrical face, normal to and intersecting the axis of the tie rod 2, as at point A (Figure 1). The corresponding axis of curvature for the cylindrical face 19 would lie in the plane of the cylindrical face 18 and would also intersect the axis of the tie rod 2. By virtue of this construction, the lines of contact between the cylindrical faces of the ball 14 and the inner faces of the seat members 22 and 23, all lie on one side of the plane through the several axes of curvature and above said plane, with the ball joint in the position shown in the drawings.

In Figures 5 and 6, however, opposed faces of the ball 40, such as the faces 41 and 42, have a common axis of curvature extending through a point B that lies above (in the drawings as shown) the axis of the tie rod. The seat members 43 and 44 are formed similarly to the seat members 22 and 23 with tapered plane faces 45 and 46, respectively, and straight plane surfaces 47 and 48, respectively. It will, however, be observed (Figure 6) that the lines of contact between the cylindrical surfaces 41 and 42 and the tapered plane surfaces 45 and 46, respectively, lie in a plane above the lines of contact between the cylindrical faces 49 and 50 of the ball and the straight plane surfaces 47 and 48 of the seat members 43 and 44. The net result insofar as the operation of the modified ball joint construction is concerned, is the same as that above described.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a ball joint, a ball of a ball stud having two pairs of opposed cylindrical surfaces, a housing therefor having an inner cylindrical wall and seat members within said housing having inner inclined plane surfaces for contact with one pair of opposed cylindrical surfaces and outer cylindrical surfaces conforming with said cylindrical wall.

2. In a ball joint, a ball of a ball stud having two pairs of opposed cylindrical surfaces, each of said surfaces having an axis of curvature normal to the axis of said stud, a cylindrical housing and bearing seats for said ball within said housing having straight tapered inner bearing faces for contact with one pair of said cylindrical surfaces and outer cylindrical surfaces conforming with said cylindrical housing.

3. In a ball joint, a ball of a ball stud having two pairs of opposed cylindrical surfaces joined through curved corner surfaces, a cylindrical housing, the cylindrical surfaces of said ball having axes normal to the axis of said housing, and seat members having outer cylindrical surfaces conforming with said housing and inner tapered plane surfaces for contact with one pair of said cylindrical ball surfaces and plane surfaces for contact with the other pair of said cylindrical surfaces.

4. In a ball joint, a ball of a ball stud having two pairs of opposed cylindrical surfaces, each pair of said cylindrical surfaces having axes normal to the axis of the stud, a housing for said ball having an inner cylindrical wall, a pair of spaced ball seats having outer cylindrical surfaces contacting said cylindrical housing wall and having inner tapered plane faces contacting one pair of opposed ball surfaces.

5. In a ball joint, a ball of a ball stud having two pairs of opposed cylindrical surfaces, each pair of said cylindrical surfaces having axes normal to the axis of the stud, a housing for said ball having an inner cylindrical wall, a pair of spaced ball seats having outer cylindrical surfaces contacting said cylindrical housing wall and having inner tapered plane faces contacting one pair of opposed ball surfaces, said ball seats also having straight plane faces contacting the other pair of ball surfaces.

6. In a ball joint, a ball of a ball stud having two pairs of opposed cylindrical surfaces, each pair of said cylindrical surfaces having axes normal to the axis of the stud, a housing for said ball having an inner cylindrical wall, a pair of spaced ball seats having outer cylindrical surfaces contacting said cylindrical housing wall and having inner tapered plane faces contacting one pair of opposed ball surfaces, said ball seats also having straight plane faces contacting the other pair of ball surfaces and resilient means urging said ball surfaces into contact with the tapered faces of said seats.

7. In a ball joint, a housing, a ball of a ball stud within said housing having surfaces curved upon axes normal to the axis of the stud, wedge shaped seat members relatively rotatable in said housing and having plane faces contacting said curved ball surfaces and means urging said ball and seat members into cooperating relation.

8. In a ball joint, a housing, a ball of a ball stud within said housing having surfaces curved upon axes normal to the axis of the stud, wedge shaped seat members relatively rotatable in said housing and having plane faces contacting said curved ball surfaces and resilient means urging said ball into line contact with said seat members.

9. In a ball joint, a housing, a ball of a ball stud mounted therein and having curved surfaces and seat members relatively rotatable with respect to said housing and having tapered plane surfaces for line contact with the curved surfaces of said ball.

10. In a ball joint, a housing having a cylindrical inner wall, a ball of a ball stud of polygonal cross section mounted within said housing and having curved surfaces and seat members having outer cylindrical faces conforming with the cylindrical wall of said housing and having a pair of tapered plane inner faces for line contact with curved surfaces of said ball.

11. In combination, a male member having a headed end of polygonal cross section, a female receiving member for said headed end affording a cylindrical opening larger than said headed end, wedging means in line contact with said headed end and in surface contact with the wall of said opening and means cooperating with said headed end, aforementioned means and female member to take up play, whereby said male and female member are capable of relative rotation and said male member is capable of angular movement relative to the axis of the cylindrical opening of said female member.

In testimony whereof I have hereunto subscribed my name at Chicago, Cook County, Illinois.

GEORGE H. HUFFERD.